US012482956B2

(12) United States Patent
Gmiha et al.

(10) Patent No.: US 12,482,956 B2
(45) Date of Patent: Nov. 25, 2025

(54) ELECTRONIC ASSEMBLY FOR A MOBILE COMMUNICATION ANTENNA, A MOBILE COMMUNICATION ANTENNA AND A METHOD FOR PRODUCING THE ELECTRONIC ASSEMBLY

(71) Applicant: Telefonaktiebolaget LM Ericsson (publ), Stockholm (SE)

(72) Inventors: Ramzi Gmiha, Stephanskirchen (DE); Viktor Heinz, Kolbermoor (DE); Jens Nita, Rosenheim (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 254 days.

(21) Appl. No.: 18/021,571

(22) PCT Filed: Aug. 19, 2020

(86) PCT No.: PCT/EP2020/073220
§ 371 (c)(1),
(2) Date: Feb. 16, 2023

(87) PCT Pub. No.: WO2022/037773
PCT Pub. Date: Feb. 24, 2022

(65) Prior Publication Data
US 2024/0014576 A1 Jan. 11, 2024

(51) Int. Cl.
*H01Q 23/00* (2006.01)
*H01Q 1/24* (2006.01)
*H01Q 1/38* (2006.01)

(52) U.S. Cl.
CPC ............. *H01Q 23/00* (2013.01); *H01Q 1/241* (2013.01); *H01Q 1/38* (2013.01)

(58) Field of Classification Search
USPC .......................................................... 343/700
See application file for complete search history.

(56) References Cited

U.S. PATENT DOCUMENTS 5,405,267 A 4/1995 Koegel et al.
6,727,777 B2 4/2004 McDonough et al.
(Continued)

FOREIGN PATENT DOCUMENTS

EP 0935315 B1 11/2001
EP 1418798 A2 * 5/2004 ........... H05K 1/0215
(Continued)

OTHER PUBLICATIONS

International Search Report and Written Opinion for International Patent Application No. PCT/EP2020/073220, mailed May 17, 2021, 10 pages.

*Primary Examiner* — Crystal L Hammond
*Assistant Examiner* — Brandon Sean Woods
(74) *Attorney, Agent, or Firm* — Withrow & Terranova, PLLC

(57) ABSTRACT

An electronic assembly comprises an electronic module and a baseplate module. The electronic module comprises a printed circuit board having a signal line and a ground plane. The baseplate module comprises a ground plane and a signal conductor, wherein the signal conductor is electrically connected to the signal line of the printed circuit board. A bushing opening extends through the printed circuit board. An electrically conductive bushing is inserted through the bushing opening in the printed circuit board and is galvanically connected to the ground plane. A screw extends through the bushing into a mounting opening of the baseplate module to form a screw connection, whereby the bushing is pressed onto the ground plane of the baseplate module to form a galvanic connection.

15 Claims, 10 Drawing Sheets

(56) References Cited

U.S. PATENT DOCUMENTS

| | | | | |
|---|---|---|---|---|
| 7,575,474 | B1 | 8/2009 | Dodson et al. | |
| 11,303,052 | B2 * | 4/2022 | Hügel | H01Q 1/38 |
| 11,476,574 | B1 * | 10/2022 | Abdelmonem | H01Q 3/2694 |
| 2010/0176896 | A1 | 7/2010 | Payne | |
| 2020/0136236 | A1 * | 4/2020 | Colapietro | H01Q 1/42 |

FOREIGN PATENT DOCUMENTS

| | | | | |
|---|---|---|---|---|
| JP | 61262302 | A * | 11/1986 | H01P 5/085 |
| JP | S61262302 | S | 11/1986 | |
| WO | 2004055938 | A2 | 7/2004 | |
| WO | 2008030772 | A2 | 3/2008 | |

* cited by examiner

ELECTRONIC ASSEMBLY FOR A MOBILE COMMUNICATION ANTENNA, A MOBILE COMMUNICATION ANTENNA AND A METHOD FOR PRODUCING THE ELECTRONIC ASSEMBLY

This application is a 35 U.S.C. § 371 national phase filing of International Application No. PCT/EP2020/073220, filed Aug. 19, 2020, the disclosure of which is incorporated herein by reference in its entirety.

TECHNICAL FIELD

The invention relates to an electronic assembly for a mobile communication antenna, a mobile communication antenna and a method for producing the electronic assembly.

BACKGROUND

A mobile communication antenna comprises a lot of components which must be factory adjusted. This involves a tuning process that has often to be carried out manually. Often the functionality of the mobile communication antenna can only be determined after its assembly. If one component is not functioning properly then the whole mobile communication antenna must be dismantled. Furthermore, these components must be electrically connected to each other, which requires high reproducibility of this connection. (e.g. cable, solder joints). These connections require also a high linear electrical contact, which avoids so called passive intermodulation in the radio frequency range and is stable for a long time.

SUMMARY

An object of the present invention is seen in simplifying a manufacturing process of an electronic assembly that is used in a mobile communication antenna and as such in simplifying the manufacturing process of the mobile communication antenna itself. The reproducibility should also be increased and the high linearity requirements for the RF-performance shall be fulfilled.

The object is solved by an electronic assembly for a mobile communication antenna according to claim 1, by the mobile communication antenna comprising such an electronic assembly according to claim 14 and by a method for producing such an electronic assembly according to claim 15. Claims 2 to 13 describe further embodiments of the electronic assembly.

The electronic assembly for a mobile communication antenna comprises an electronic module and a baseplate module. The electronic module comprises a substrate, in particular a printed circuit board. The printed circuit board comprises at least one signal line and at least one ground plane. The baseplate module comprises at least one ground plane and at least one signal conductor. The at least one signal conductor of the baseplate module is electrically connected to the at least one signal line of the printed circuit board. The ground plane of the baseplate module could be part of the housing of the baseplate module. The housing could be made of a metal (e.g. aluminum) or it could be made of plastic having an electrically conductive layer. Furthermore, the printed circuit board comprises at least one bushing opening. At least one electrically conductive bushing is provided. The bushing comprises a first end and an opposite second end. The at least one bushing is inserted through the at least one bushing opening and is further galvanically connected to the at least one ground plane of the printed circuit board. The baseplate module comprises at least one mounting opening. In addition, at least one screw is provided which extends with its screw body through the at least one bushing and engages into the at least one mounting opening of the baseplate module thereby establishing a screw connection. As a result, the at least one bushing is pressed with its first end onto the ground plane of the baseplate module thereby forming a galvanic connection between the ground plane of the baseplate module and the bushing.

It is very beneficial, that a reproducible galvanic connection between two modules can easily be achieved by using only a screw and a bushing. By tightening the screw connection, a force is applied which pushes the bushing further in the direction of the ground plane of the baseplate module. The electric contact is reproducible in other electronic assemblies by applying the same force on the screw connection. In addition, the connecting method according to the present invention is cable free and does not change over time. The use segregate of the antenna electronics into an electronic module and a baseplate module allows that the individual modules can be tested before being mounted together. This ensures that only fully functional components are mounted together. In turn, the chances that a mounted antenna has to be dismantled are significantly reduced.

In a further embodiment, the at least one bushing is soldered to the at least one ground plane on the first side (this side faces towards the baseplate module) of the printed circuit board. More preferably, an annular soldered joint around the bushing is applied. This ensures that the galvanic connection between the bushing and the ground plane of the printed circuit board is optimal (symmetrical) and that the position of the bushing relative to the printed circuit board does not change over time.

In another embodiment, a screw head of the at least one screw rests directly or indirectly on the second end of the at least one bushing. When the head rests directly on the second end of the at least one bushing, the head is in direct contact with the bushing. When the head rests indirectly on the second end of the bushing, another object could be arranged in between. This could be for example a washer and/or a part of the housing cover. The washer could be electrically conductive or of a dielectric material.

In another embodiment the at least one bushing is free of the thread. This ensures that no metal parts of the bushing are scraped off when inserting the screw which would otherwise result in higher passive intermodulation (PIM). The inner walls of the bushing are preferably smooth.

In another embodiment, the wall thickness of the at least one bushing is thinner in the region between the first side of the printed circuit board and the first end of the at least one bushing than in the region between the second side of the printed circuit board and the second end of the at least one bushing. As a result, the at least one bushing comprises a flexible/elastic segment (at least in the region between the first side of the printed circuit board and the first end of the bushing). This increases the reproducibility of the galvanic contact between the bushing and the ground plane of the baseplate module.

In a preferred embodiment, the at least one bushing and the at least one mounting opening of the baseplate module are coaxially aligned.

In a further embodiment, the at least one bushing comprises over its entire length a diameter which is smaller than the at least one bushing opening of the printed circuit board. As a result, the at least one bushing is arranged on the printed circuit board without any stops (abutments). The wording “diameter” should not only be understood in such a way that the bushing has a circular cross-section. The cross-section could also be other than circular, like for example rectangular. However, a circular cross-section is preferred.

In another preferred embodiment, the at least one bushing comprises over a part of its length a diameter which is larger than the diameter of the at least one bushing opening, thereby forming a stop surface. The at least one bushing then rests with its stop surface on the second side of the printed circuit board. It is beneficial that the insertion of the bushing is easily reproducible. After the bushing has been fully inserted, the bushing is preferably soldered (e.g. by applying a circular soldered joint) to the first side of the printed circuit board. The distance between the printed circuit board and the baseplate module is therefore always the same.

In a further preferred embodiment, the electronic module comprises a housing cover. The housing cover at least partially encloses the second side of the printed circuit board. Furthermore, the housing cover comprises at least one insertion opening. The insertion opening is preferably located (directly) above the bushing opening. As a result, the bushing can be inserted through the insertion opening after the housing cover is attached to the printed circuit board. A diameter of the insertion opening is larger than a diameter of the at least one bushing along its longitudinal axis. In that case, the movement of the bushing into the bushing opening of the printed circuit board is not blocked in any way by the housing cover. In other words, the at least one bushing is supported free of stops relative to the housing cover. Contrary to that, it could also be possible that the diameter in the region of the second end of the at least one bushing is larger than the insertion opening of the housing cover. As a result, the housing cover blocks the further insertion of the bushing into the insertion opening of the housing cover and thereby into the bushing opening of the printed circuit board. A “stop” is established. The positioning and the arrangement of the bushing is thereby more accurate.

In another embodiment, the printed circuit board comprises at least one signal line opening. The baseplate module comprises at least one receiving room. The at least one signal conductor which is encompassed (surrounded) by a dielectric is arranged in the at least one receiving room. The at least one signal conductor protrudes from the at least one receiving room of the baseplate module and projects through the at least one signal line opening of the printed circuit board. The at least one signal conductor is electrically connected to the at least one signal line of the printed circuit board. It is also very beneficial, that no cable connection is used for transmitting a signal between the baseplate module and the electronic module. The signal is only transmitted via the signal conductor which is basically an electrically conductive pin and which preferably extends in the longitudinal axis.

In another preferred embodiment, the housing cover comprises at least one opening for inserting a soldering tool. The opening is preferably arranged (right) above the signal line opening in the printed circuit board. As a result, the at least one signal conductor projecting through the at least one signal line opening can be soldered to the signal line on the second side of the printed circuit board. This soldering can be done after the housing cover has been applied to the printed circuit board and after the electronic module has been screwed to the baseplate module. In addition or alternatively the housing cover might also comprise side walls. The housing cover might be tub-shaped. At least one of the side walls has at least one opening for inserting soldering material like solder. In general, solder could be fed through the opening in the sidewall, wherein the soldering tool can be inserted through the opening in the cover right above the signal line opening (in the top of the cover). Since the signal conductor rests in place because of the screw connection through the bushing, a perfect solder joint (preferably of an annular type) can be applied.

In a further embodiment, a space is formed between an upper side of the baseplate module (which faces the first side of the printed circuit board) and the first side of the printed circuit board of the electronic module. More preferably, the baseplate module and the printed circuit board are arranged to each other in a contact-free manner A contact between the baseplate module and the printed circuit board is preferably only achieved by the bushing and the signal conductor. The baseplate module and the electronic module are therefore stacked.

In another embodiment, additional bushings are provided for establishing an electrical contact between the ground plane of the baseplate module and the ground plane of the printed circuit board of the electronic module. The at least one bushing and the additional bushings are arranged symmetrically to each other and are spaced apart symmetrically from the at least one signal conductor. As a result, both ground planes are galvanically connected to each other with a low resistance.

In another embodiment, the signal conductor has an impedance of 50 ohm and the signal line of the printed circuit board has also an impedance of 50 ohm.

The mobile communication antenna according to one embodiment of the present invention comprises at least one electronic assembly as already described. The mobile communication antenna further comprises a plurality of radiator elements (e.g. dual-polarised dipoles) and the reflector arrangement (e.g. reflector plane). The radiator elements are arranged on a first side of the reflector arrangement. The at least one electronic assembly is arranged on a second side (opposite of the first side) of the reflector arrangement. The electronic module of the at least one electronic assembly comprises at least one phase shifter having several outputs. The outputs of the at least one phase shifter are electrically connected to the radiator elements. The baseplate module comprises at least one combiner. The at least one signal conductor is connected (capacitively, inductively or galvanically) to a common port of the at least one combiner. It is very beneficial, that the mobile communication antenna can be very compact in size by using the electronic assembly according to the present invention.

A method for producing the electronic assembly of the present invention comprises several steps. In a first step, the electronic module and the baseplate module are tested separately. In a second step, the at least one bushing is inserted into the at least one bushing opening. In the third step, the at least one bushing is soldered to the at least one ground plane on the first side of the printed circuit board. In the fourth step, the at least one screw is inserted through the at least one bushing and screwed in the mounting opening of the baseplate module, thereby establishing a screw connection between the electronic module and the baseplate module. In a fifth step, the at least one signal conductor is soldered to the at least one signal line on the second side of the printed circuit board. It is very beneficial that both, the electronic module and the baseplate module can be tested separately. Only if the electronic module and the baseplate module are fully functioning they are used in the further manufacturing process. This reduces the numbers of faulty electronic assemblies.

BRIEF DESCRIPTION OF THE DRAWINGS

Different embodiments of the invention will be described in the following, by way of example and with reference to the drawings. The same elements are provided with the same reference signs. The figures show in detail.

DETAILED DESCRIPTION

Figure 1:
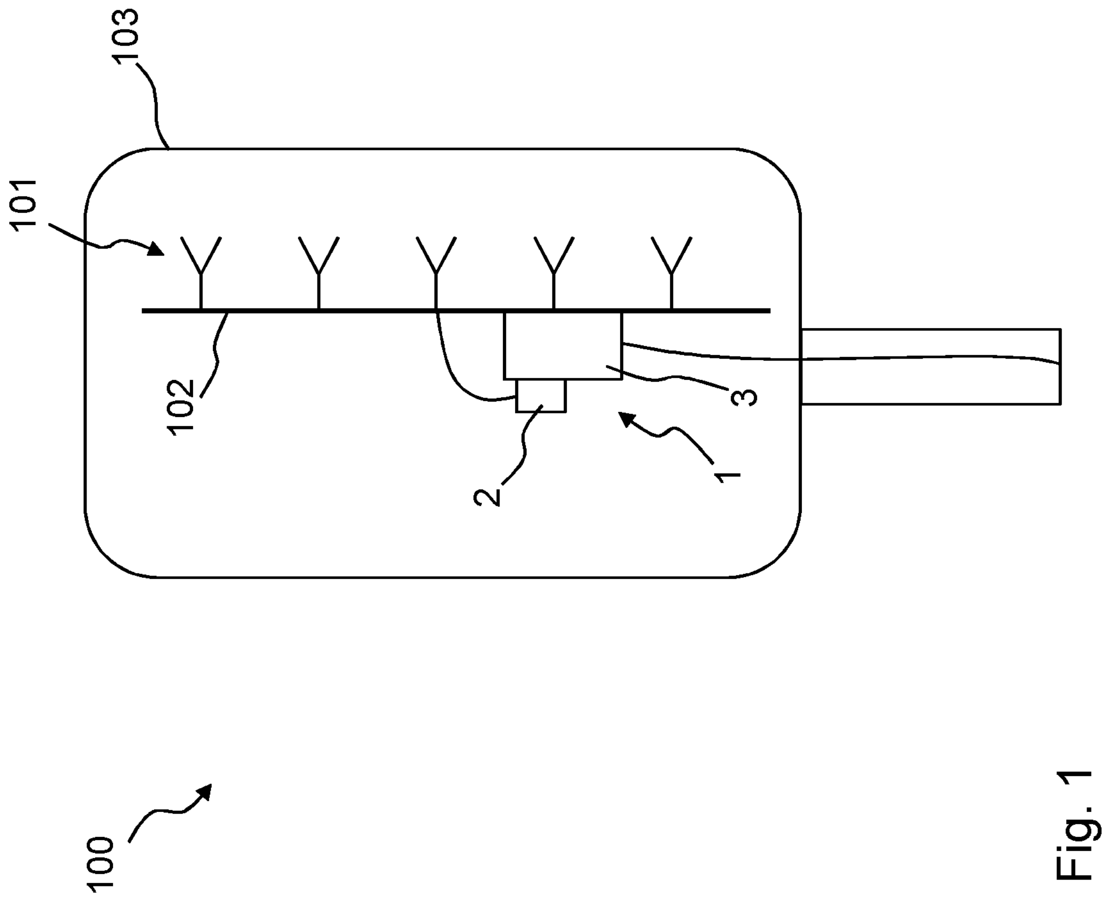
FIG. 1: a mobile communication antenna with a least one electronic assembly according to the present invention.
Figure 3:
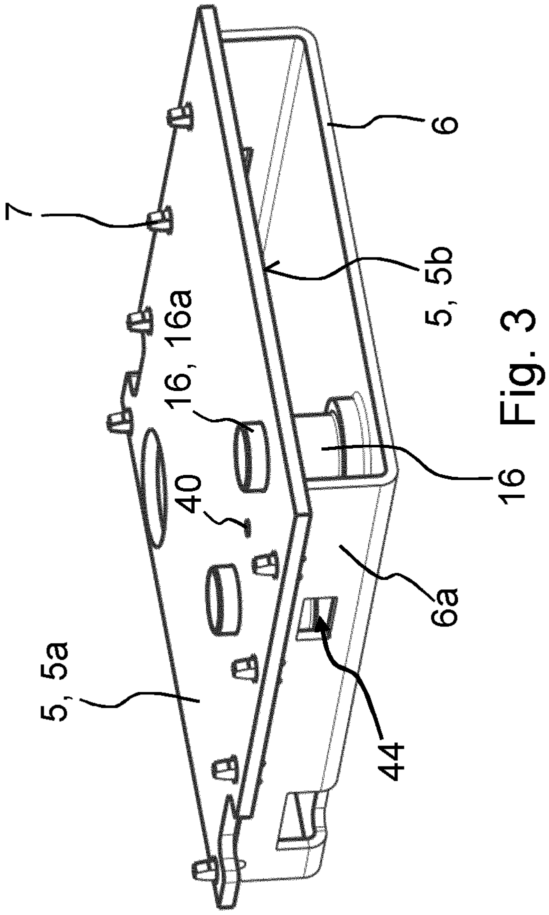
FIG. 3: a three-dimensional view of the electronic module shown in FIGS. 2A and 2B.

FIG. 1 shows are mobile communication antenna 100 which comprises at least one electronic assembly 1 according to the present invention. The mobile communication antenna 100 also comprises a plurality of radiator elements 101 and a reflector arrangement 102. The radiator elements 101 are arranged on a first side of the reflector arrangement 102 and the electronic assembly 1 is arranged on a second side of the reflector arrangement 102. The mobile communication antenna can preferably be operated in a frequency range starting from 500 to 600 MHz and up to 1700 to 2700 MHz or up to 3000 to 3500 MHz. The mobile communication antenna 100 also comprises a radome 103 which encloses the plurality of radiator elements 101, the reflector arrangement 102 and the electronic assembly 1.

The electronic assembly 1 comprises an electronic module 2 and a baseplate module 3. The electronic module 2 preferably comprises at least one phase shifter. The at least one phase shifter has preferably several outputs, wherein the outputs of the at least one phase shifter are electrically connected to the radiator elements 101. This is preferably done by a cable connection. The electronic module 2 could also comprise a matching network. The baseplate module 3 preferably comprises at least one combiner. A common port of the at least one combiner is preferably connected to the at least one phase shifter (e.g. to the moving arm). Furthermore, the connecting ports of the combiner for the uplink and downlink signal are connected to respective feeder cables. It could also be possible, that the at least one combiner comprises at least one low noise amplifier for amplifying signals sent from a mobile to the mobile communication antenna (uplink). In addition or alternatively, it could also be possible, that the at least one combiner comprises at least one a power amplifier for amplifying signals to be sent from the base station through the mobile communication antenna to the mobile (downlink). The at least one low noise amplifier and/or the at least one power amplifier could also be part of the baseplate module 3.

The combiner is preferably in cavity design and is more preferably an aluminum die-cast part.

In the following, reference is made to FIGS. 2A, 2B, 3, 4A, 4B and 4C describing a first embodiment of the electronic assembly 1 according to the present invention. As mentioned above, the electronic assembly 1 comprises an electronic module 2 and a baseplate module 3. The electronic module 2 is stacked onto the baseplate module 3. The electronic module 2 comprises a printed circuit board 5, wherein the printed circuit board 5 comprises at least one signal line and at least one ground plane. The signal line could be a co-planar line or a suspended substrate. The printed circuit board 5 comprises a first side 5*a* and a second side 5*b*. The first side 5*a* is directed towards the baseplate module 3.

The electronic module 2 also comprises a housing cover 6. The housing cover 6 at least partially (or fully) encloses the second side 5*b* of the printed circuit board 5. The housing cover 6 also comprises side walls 6*a*. With respect to FIG. 3, the housing cover 6 has an U-shaped cross-section. At the end of the side walls 6*a* engagement pins 7 are arranged. The engagement pins 7 project through fastening openings extending through the printed circuit board 5. As a result, the engagement pins 7 can be soldered to the first side 5*a* of the printed circuit board 5. This prevents that the housing cover 6 can be removed. The housing cover 6 is preferably free of any side walls at the front sides, because connector elements 8 (see FIGS. 2A, 2B) are arranged at the front sides. Those connector elements 8 are preferably coaxial connectors and are more preferably used to connect the electronic module 2 to the plurality of radiator elements 101.

The housing cover 6 preferably consists of or comprises metal like aluminum or copper.

Figure 2A:
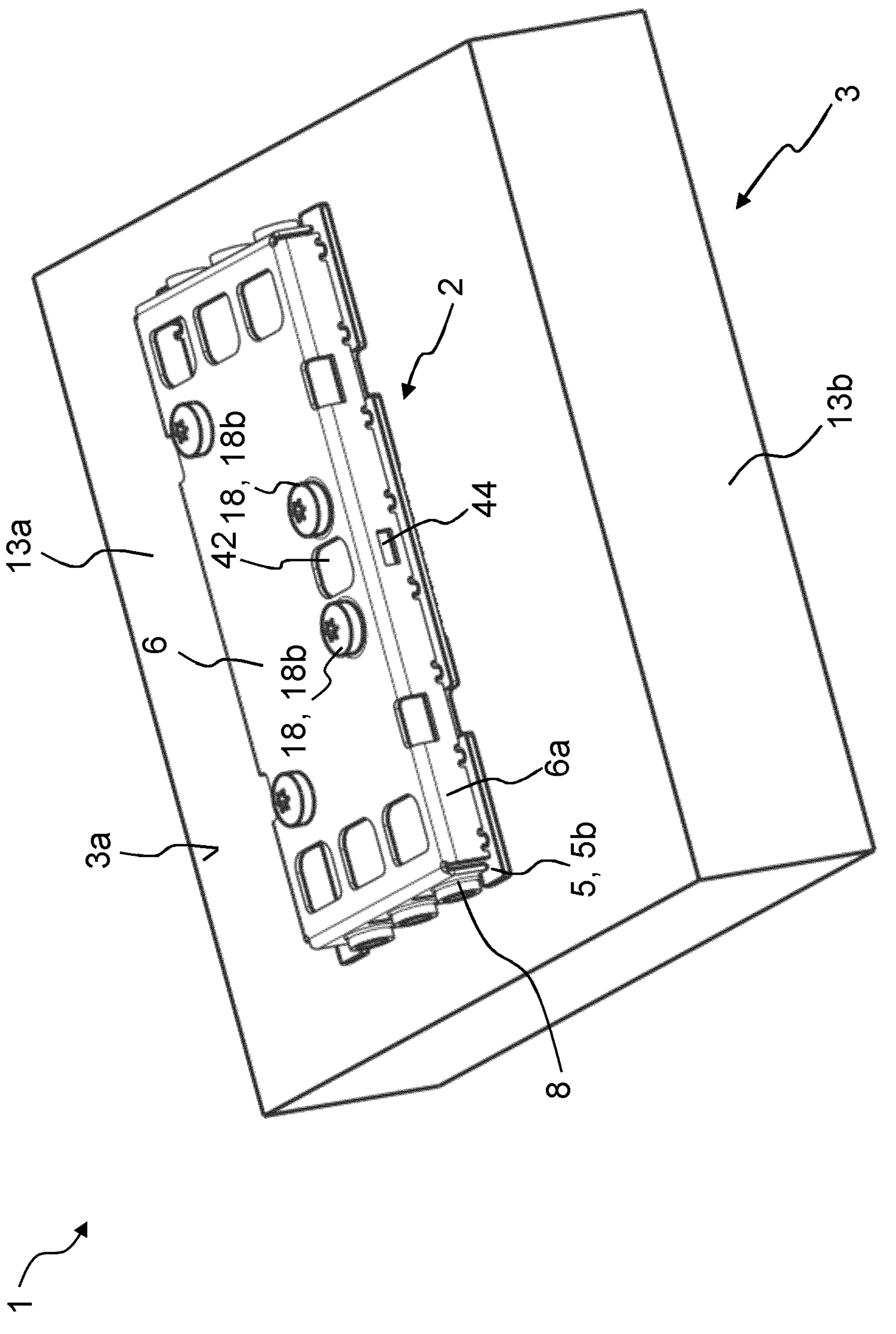
FIGS. 2A, 2B: a first embodiment of the electronic assembly according to the present invention which comprises an electronic module and a baseplate module.
Figure 2B:
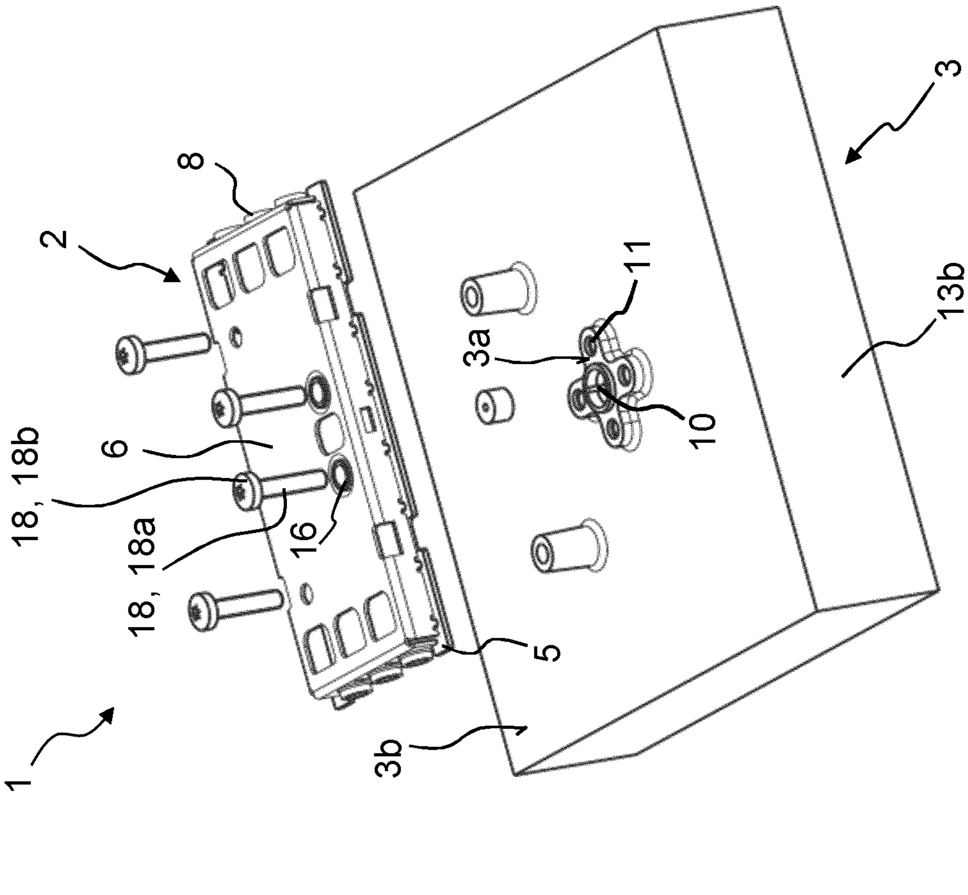

Referring again to FIGS. 2A, 2B, the baseplate module 3 comprises at least one ground plane 3*a* (which is preferably part of the top surface) and at least one signal conductor 10. As will be explained later, the at least one signal conductor 10 of the baseplate module 3 is electrically connected to the at least one signal line of the printed circuit board 5. The baseplate module 3 also comprises at least one mounting opening 11. Four mounting openings 11 are shown in FIG. 2B. If there are n mounting openings 11 with n≥2, 3, 4, then the n mounting openings 11 are preferably arranged around the at least one signal conductor 10 and are preferably spaced from each other by $\alpha=360°/n$.

The area (ground plane 3*a*) where the mounting openings 11 are located is preferably elevated compared to the surrounding area of the baseplate module 3. In that case, the respective part of the upper surface of the baseplate module 3 which comprises the openings 11 protrudes from the surrounding upper surface 3*b* of the baseplate module 3. However, the respective part 3*a* of the upper surface could also be flush with the surrounding upper surface 3*b*. The mounting opening 11 comprises a thread.

The baseplate module 3 preferably comprises a wall 13*a* with the upper surface 3*a* and side walls 13*b* to enclose the cavity structure. The wall 13*a* and the side walls 13*b* are preferably made of a single part. A lid (not shown) closes the cavity structure. Tuning elements, preferably in form of tuning screws, could also be provided. Those tuning elements could be inserted into the cavity structure. The cavity structure is preferably formed in a die-cast process and/or in a milling process.

Figure 4A:
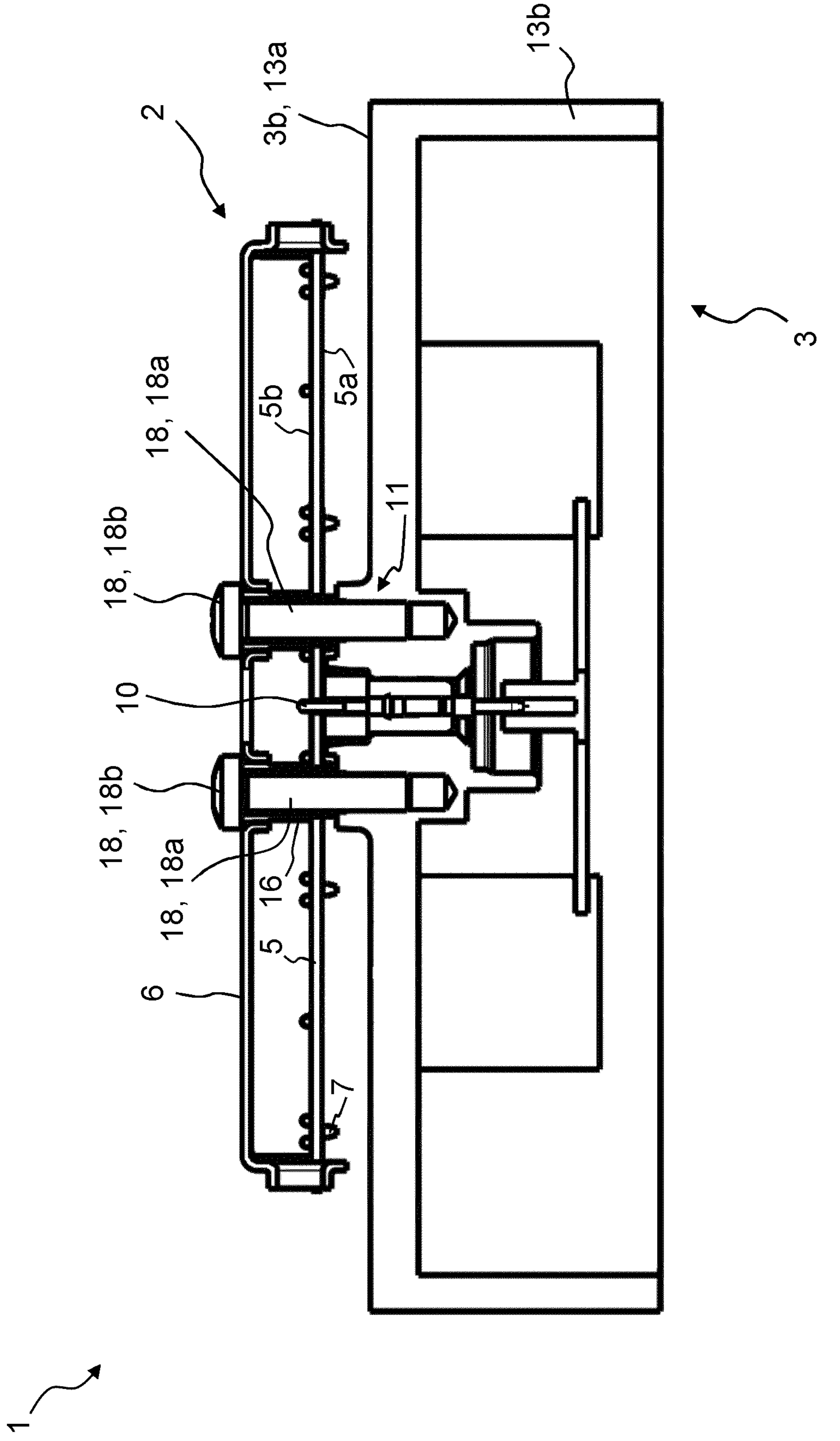
FIGS. 4A, 4B: a longitudinal section view through the electronic assembly of FIG. 2A.
Figure 4B:
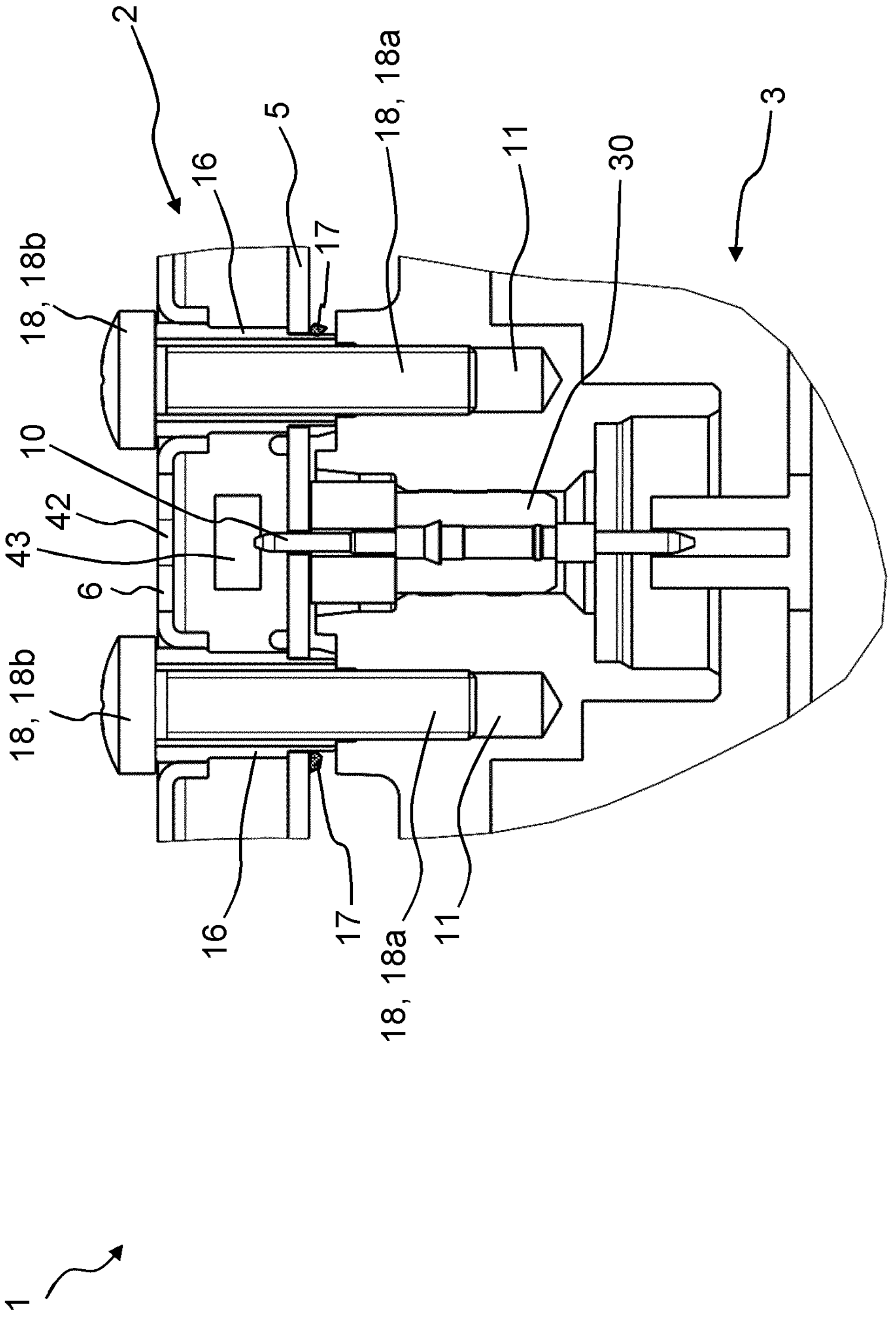
Figure 4C:
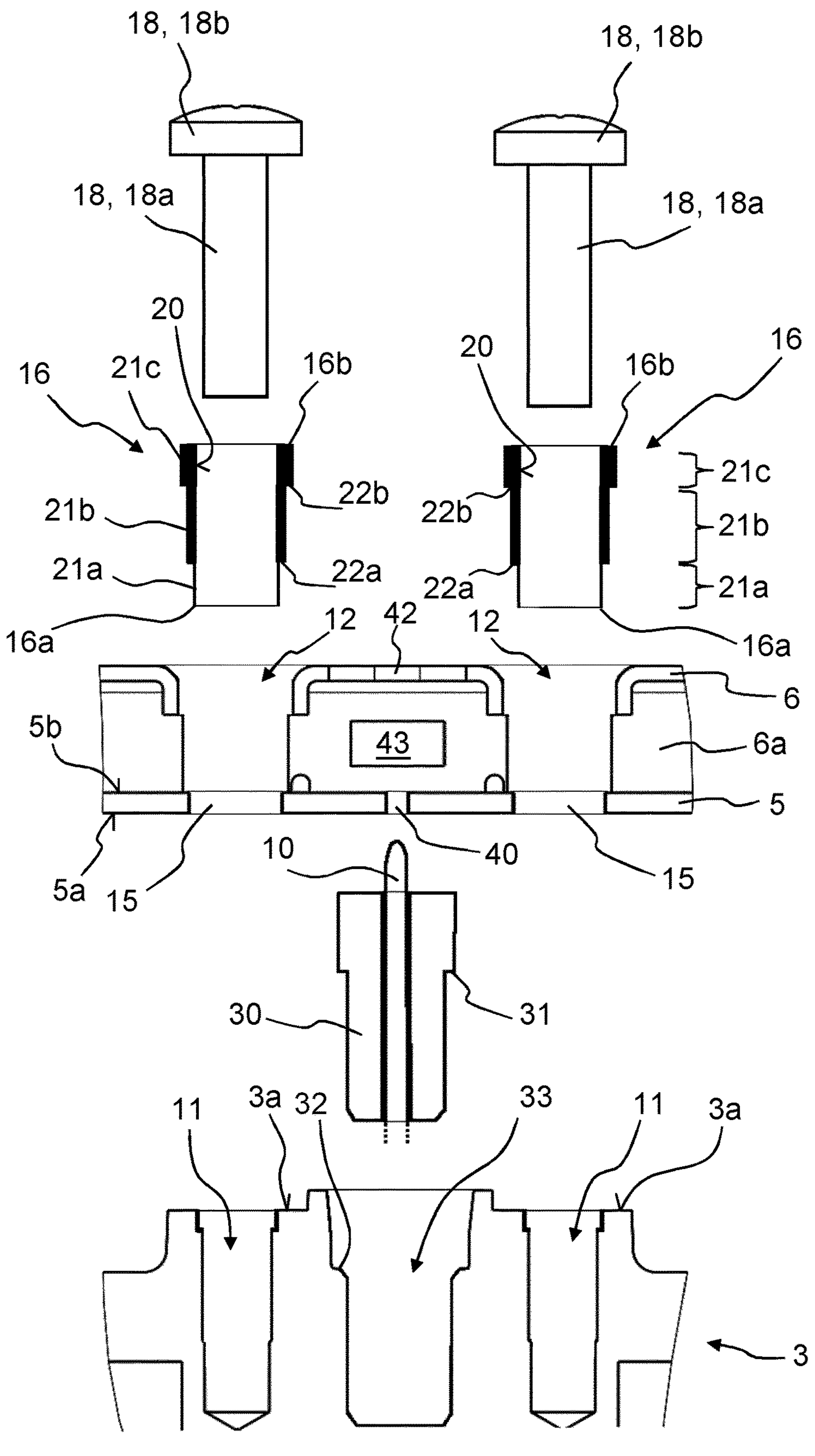
FIG. 4C: an exploded view of the electronic assembly of FIGS. 2A and 2B.
Figure 6A:
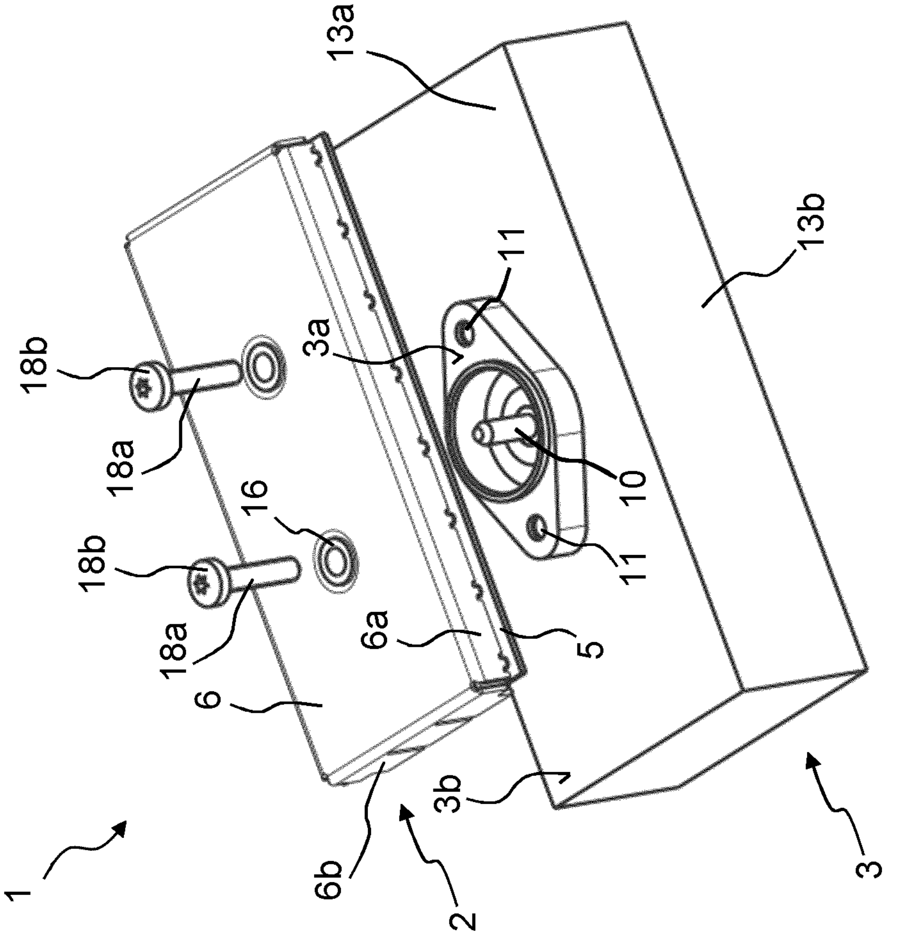
FIG. 6A: a second embodiment of the electronic assembly according to the present invention which comprises an electronic module and a baseplate module.

Referring now to FIGS. 4A, 4B, 4C which describe the electronic module 2 is connected to the baseplate module 3. The printed circuit board 5 comprises at least one bushing opening 15. The at least one bushing opening 15 extends through the printed circuit board 5. At least one electrically conductive bushing 16 is inserted into the bushing opening 15. The electrically conductive bushing 16 comprises a first end 16*a* and the second end 16*b*. The bushing 16 projects through the at least one bushing opening 15 and is further galvanically connected to the at least one ground plane of the printed circuit board 5. This connection is preferably achieved by using soldered joint 17 (FIG. 4B). The soldered joint 17 is preferably applied on the outer wall of the bushing 16 and the first side 5 of the printed circuit board 5. The ground plane of the printed circuit board 5 is preferably arranged next to the bushing opening 15.

Preferably, the housing cover 6 also comprises at least one insertion opening 12 for insertion of the at least one bushing 16. The insertion opening 12 is preferably arranged above the at least one bushing opening 15.

Furthermore, at least one screw 18 is provided which extends with its screw body 18*a* through the at least one bushing 16 and engages into the at least one mounting opening 11 of the baseplate module 3. By tightening the screw connection, the bushing 16 is pressed towards the ground plane 3*a* of the baseplate module 3. The first end 16*a* of the bushing 16 comes into galvanic contact with the ground plane 3*a* of the baseplate module 3.

As can be seen in FIGS. 4A and 4B, the screw head 18*b* of the screw 18 rests directly on the second end 16*b* of the at least one bushing 16.

The inner walls 20 of the bushing 16 are preferably smooth.

The thickness of the wall of the at least one bushing 16 is thinner in the region between the first side 5*a* of the printed circuit board 5 and the first end 16*a* of the at least one bushing 16 compared to the wall sickness in the region between the second side 5*b* of the printed circuit board 5 and the second end 16*b* of the at least one bushing 16.

It can be seen in FIG. 4C that the bushing 16 comprises several segments 21*a*, 21*b*, 21*c*. The first segment 21*a* is part of the region at the first end 16*a* of the bushing 16. The first segment 21*a* is followed by the second segment 21*b* which has thicker wall than the first segment 21*a*. As a result, the bushing 16 has a first stop surface 22*a*. The first stop surface 22*a* is formed on the outer wall of the bushing 16. When inserting the bushing 16 into the bushing opening 15 of the printed circuit board 5, the first stop surface 22*a* rests on the second side 5*b* of the printed circuit board 5. Optionally, there could also be the third segment 21*c*. Preferably the second segment 21*b* is then followed by the third segment 21*c*. The wall of the bushing 16 in the third segment 21*c* is again thicker than the wall of the bushing 16 in the second segment 21*b*. As a result, the bushing 16 has a second stop surface 22*b*. The second stop surface 22*b* is formed on the outer wall of the bushing 16. The bushing 16 could rest with its second stop surface 22*b* on a part of the housing cover 6 within the insertion opening 12.

Within the first embodiment of the present invention, a diameter in the region of the second end 16*b* of the at least one bushing 16 is larger than the insertion opening 12 of the housing cover 6 so that the (second) stop surface 22*b* is formed. It is clear, that it would also be possible for the bushing 16 to provide only one stop surface 22*a*, 22*b*.

It is very beneficial, that the first segment 21*a* has the thinnest walls, thereby being (slightly) elastic, because the first segment 21*a* comes into galvanic contact with the ground plane 3*a* of the baseplate module 3. Having elastic properties is advantageous, because by tightening the screw connection, the first segment 21*a* slightly bends, thereby ensuring that a proper galvanic connection is established.

The at least one signal conductor 10 is enclosed by dielectric element 30. The dielectric element 30 is preferably single piece and more preferably made of plastic (e.g. polytetrafluorethylene PTFE). The dielectric element 30 preferably comprises a stop surface 31 on its outer wall which rests on a stop surface 32 of a receiving room 33 in the baseplate module 3. The at least one receiving room 33 widens itself towards the electronic module 2, so that the at least one signal conductor 10 together with the dielectric element 30 can easily be inserted into the respective receiving room 33.

The dielectric element 30 preferably protrudes above the surrounding ground plane 3*a* of the baseplate module 3. This ensures, that the galvanic contact between the baseplate module 3 and the electronic module 2 is only made by the at least one bushing 16.

Furthermore, the printed circuit board 5 comprises at least one signal line opening 40. The at least one signal conductor 10 protrudes from the at least one receiving room 33 of the baseplate module 3 and projects through the at least one signal line opening 40 of the printed circuit board 5 and is electrically connected to the at least one signal line of the printed circuit board 5. The electrical connection, preferably a galvanic connection, is more preferably made by or solder joint 41 (FIG. 4B) on the second side 5*b* of the printed circuit board 5. In order to apply such a solder joint 41, the housing cover 6 preferably comprises at least one opening 42 (FIG. 2A) for inserting a soldering tool.

The at least one opening 42 is preferably arranged above the at least one signal line opening 40. In addition or alternatively, the housing cover 6 comprises at least another opening 43 in the side walls 6*a* of the housing cover 6. This at least another opening 43 is used for inserting soldering material.

As can be seen in FIG. 4B, more than one bushing 16 can be used to establish a galvanic contact between the ground plane 3*a* of the baseplate module 3 and the ground plane of the printed circuit board 5 of the electronic module 2.

A minimal distance 9 between the baseplate module 3 and the first side 5*a* of the printed circuit board 5 is preferably smaller than 5 mm, 4 mm, 3 mm, 2 mm, but larger than 0.3 mm or larger than 0.5 mm.

The first side 5*a* of the printed circuit board 5 is preferably mostly or fully free of the housing cover 6.

In general, the insertion opening 12 could widen itself up towards the outside of the electronic module 2 so that the bushing 16 can easily be inserted into the insertion opening 12.

Preferably, there are two galvanic contacts applied by using two bushings 16 for each signal conductor 10. The distance between the respective bushings 16 and the signal conductor 10 is preferably less than 5 cm, 4 cm, 3 cm or less than 1 cm but preferably more than 0.5 cm.

Figure 5:
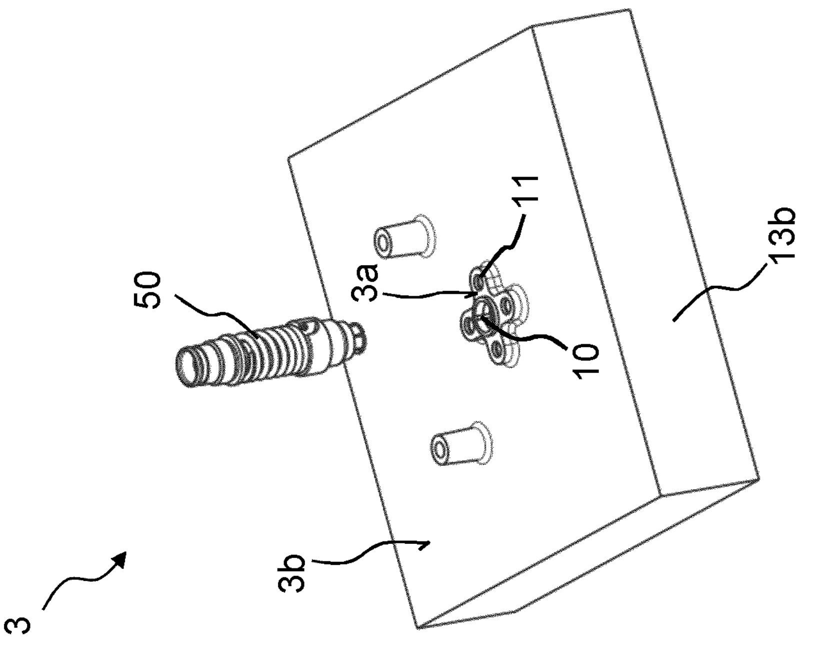
FIG. 5: a three-dimensional view of the baseplate module shown in FIGS. 2A and 2B and a test adapter.
Figure 6B:
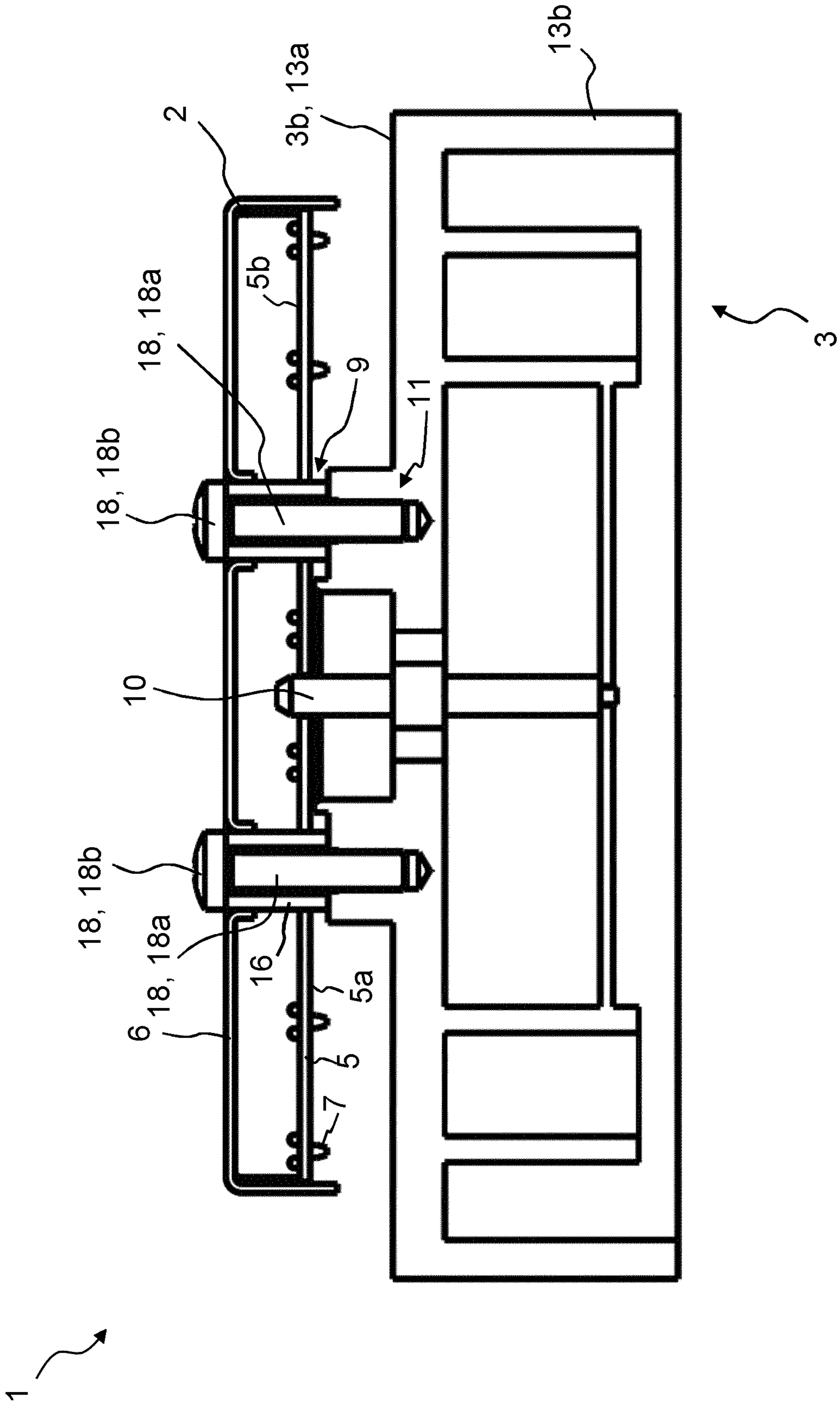
FIGS. 6B, 6C: a longitudinal section view through the electronic assembly of FIG. 6A.
Figure 6C:
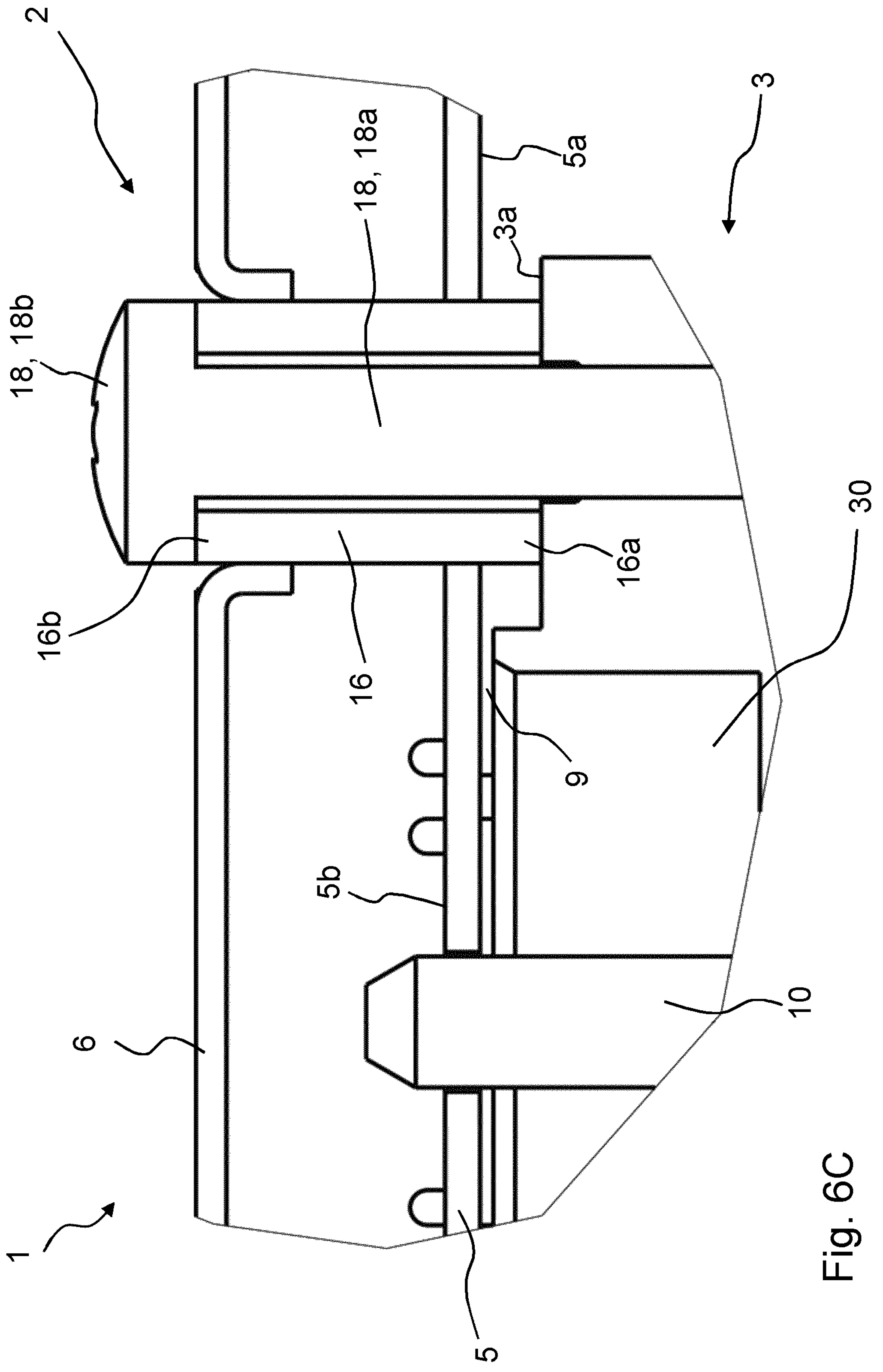

FIG. 5 describes the use of the test adapter 50. The test adapter 50 is used to verify whether the baseplate module 3 is fully functional before mounting it to the electronic module 2. The test adapter 50 can be plugged onto the signal conductor 10. The test adapter 50 could also be inserted directly into the receiving room 33 before inserting the dielectric element 30 together with the signal conductor 10.

In the following, reference is made to FIGS. 6A, 6B, 6C and 7 in which the second embodiment according to the present invention is described. Subsequently, only the differences with respect to the first embodiment will be explained. As can be seen, the signal conductor 10 has a bigger diameter compared to the signal conductor 10 of the first embodiment. Another difference is that the bushing 16 is free of a stop surface. The bushing 16 is cylindrical-shaped. As a result, the bushing 16 rests only on the ground plane 3*a* of the baseplate module 3. In other words, the at least one bushing 16 comprises over its entire length a diameter which is smaller than the at least one bushing opening 15 of the printed circuit board 5 so that the at least one bushing 16 is arranged on the printed circuit board 5 without any stops. The same is also true for the insertion opening 12 of the housing cover 6. A diameter of the insertion opening 12 is larger than the diameter of the at least one bushing 16 along its longitudinal axis (its entire length) so that the at least one bushing 16 is supported free of stops relative to the housing cover 6. By tightening the screw connection, the screw head 18*b* of the screw 18 rests on the second end 16*b* of the bushing 16 thereby pressing the first end 16*a* of the bushing 16 with a specified force onto the ground plane 3*a* of the baseplate module 3.

The housing cover 6 comprises side walls 6*b* at the front sides. As such, the front sides are closed. The housing cover 6 is also free of openings for inserting the soldering tool or the solder material.

Figure 7:
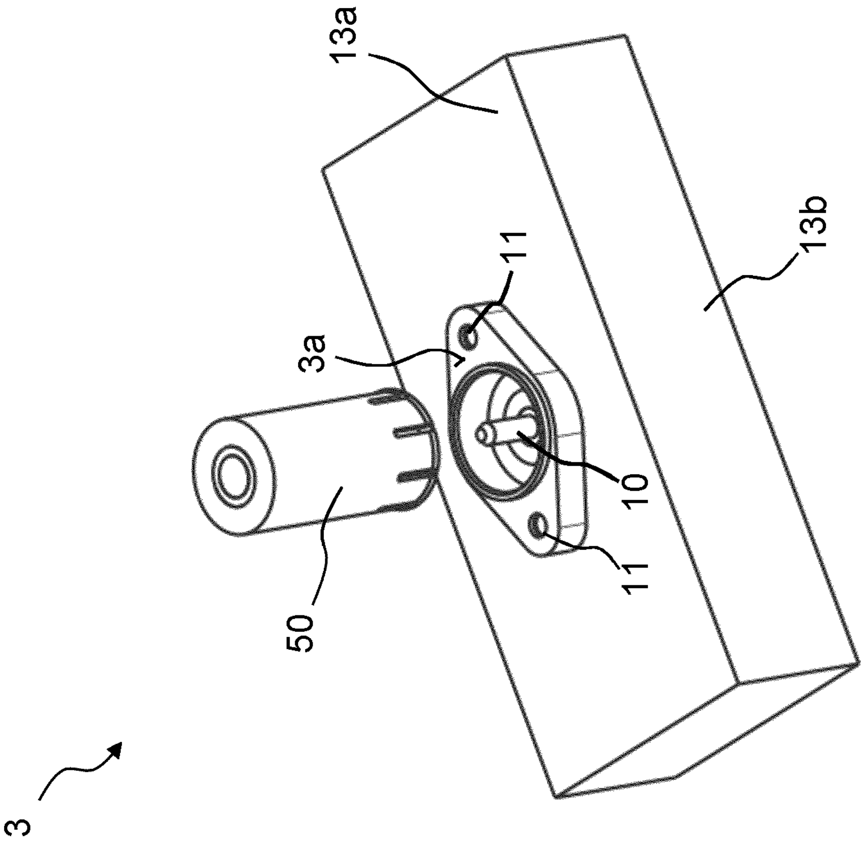
FIG. 7: a three-dimensional view of the baseplate module shown in FIG. 6A and a test adapter.

FIG. 7 also describes the use of the test adapter 50. The test adapter 50 is used to verify whether the baseplate module 3 is fully functional before mounting it to the electronic module 2. The test adapter 50 can be plugged onto the signal conductor 10. The test adapter 50 could also be inserted directly into the receiving room 33 before inserting the dielectric element 30 together with the signal conductor 10.

Figure 8:
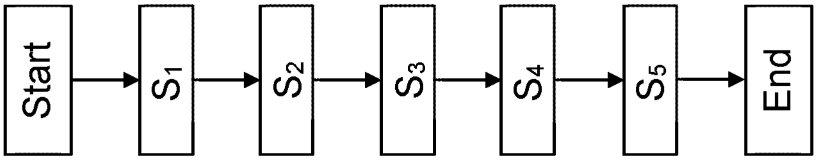
FIG. 8: a flow chart for producing the electronic assembly according to the present invention.

FIG. 8 describes a method for manufacturing the electronic assembly 1. In step $S_1$, both the electronic module 2 and the baseplate module 3 are tested to ensure full functionality. In step $S_2$, the at least one bushing 16 is inserted into the at least one bushing opening 15. Between step $S_1$ and step $S_2$, an intermediate step could be carried out in which the housing cover 6 is applied on (e.g. soldered onto) the second side 5*b* of the printed circuit board 5. After step $S_2$, step $S_3$ is carried out. Within step $S_3$ the at least one bushing 16 is soldered to the ground plane on the first side 5*a* of the printed circuit board. Within step $S_4$ the at least one screw 18 is inserted through the at least one bushing 16. By tightening the screw connection, the at least one screw 18 engages with the at least one mounting opening 11 of the baseplate module 3. It could be possible that the screw connection is tightened with the predetermined torque. Afterwards, step $S_5$ is carried out. Within step $S_5$ the at least one signal conductor is soldered to the at least one signal line on the second side 5*b* of the printed circuit board 5.

In the following some advantages of the electronic assembly 1 are emphasized separately.

The electronic assembly 1 preferably comprises the following feature:

a ground contact between the baseplate module 3 and the electronic module 2 is only established via the at least one bushing 16.

The electronic assembly 1 preferably comprises the following feature:

n bushings 16 with n≥2, 3, 4 are provided, which are arranged around the at least one signal conductor 10 and which are spaced from each other by $\alpha=360°/n$.

The electronic assembly 1 preferably comprises the following feature:

the baseplate module 3 comprises a RF-filter (combiner) in cavity design. The RF-filter is in particular an aluminum die-cast part.

The electronic assembly 1 preferably comprises the following feature:

the baseplate module 3 comprises an LNA (low noise amplifier) and/or a PA (power amplifier). The LNA is preferably used to amplify signals received from the mobile (uplink) and the PA is preferably used to amplify signals sent to the mobile (downlink).

The electronic assembly 1 preferably comprises the following feature:

the electrical connection between the at least one bushing 16 and the baseplate module 3 is solderless (free of solder).

The electronic assembly 1 preferably comprises the following feature:

the at least one bushing 16 is one-piece.

The electronic assembly 1 preferably comprises the following features:

the at least one bushing 16 is a lathed part, bent part, laser part and/or punched part; and/or the housing cover 6 is a lathed part, bent part, laser part and/or punched part.

The electronic assembly 1 preferably comprises the following feature:

the at least one bushing 16 is made of or comprises a metal (e.g. copper)

The electronic assembly 1 preferably comprises the following feature:

the screw head 18*b* of at least one screw 18 ends flush with the housing cover 6 or projects beyond the housing cover 6.

The electronic assembly 1 preferably comprises the following feature:

the screw 18 comprises or consists of metal or plastic (dielectric).

Some of the embodiments contemplated herein are described more fully with reference to the accompanying drawings. Other embodiments, however, are contained within the scope of the subject matter disclosed herein. The disclosed subject matter should not be construed as limited to only the embodiments set forth herein; rather, these embodiments are provided by way of example to convey the scope of the subject matter to those skilled in the art.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

The invention claimed is:

1. An electronic assembly for a mobile communication antenna comprising an electronic module and a baseplate module with the following features:

the electronic module comprises a substrate, preferably in form of a printed circuit board, wherein the printed circuit board comprises at least one signal line and at least one ground plane;

the baseplate module comprises at least one ground plane and at least one signal conductor, wherein the at least one signal conductor is electrically connected to the at least one signal line of the printed circuit board;

the printed circuit board comprises a first side and an opposite second side, wherein the first side faces the baseplate module;

at least one bushing opening extends through the printed circuit board;

at least one electrically conductive bushing with a first end and an opposite second end is provided, wherein the at least one bushing is inserted through the at least one bushing opening and is galvanically connected to the at least one ground plane of the printed circuit board;

the baseplate module comprises at least one mounting opening;

at least one screw is provided which extends with its screw body through the at least one bushing and engages into the at least one mounting opening of the baseplate module to form a screw connection, whereby the at least one bushing is pressed with its first end onto the ground plane of the baseplate module to form a galvanic connection.

2. The electronic assembly according to claim 1, characterized by the following feature:

the at least one bushing is soldered to the at least one ground plane on the first side of the printed circuit board.

3. The electronic assembly according to claim 1, characterized by the following feature:

a screw head of the at least one screw rests directly or indirectly on the second end of the at least one bushing.

4. The electronic assembly according to claim 1, characterized by the following feature:

the at least one bushing is free of a thread.

5. The electronic assembly according to claim 1, characterized by the following feature:

the wall thickness of the at least one bushing is thinner in the region between the first side of the printed circuit board and the first end of the at least one bushing than in the region between the second side of the printed circuit board and the second end of the at least one bushing.

6. The electronic assembly according to claim 1, characterized by the following feature:

the at least one bushing and the at least one mounting opening of the baseplate module are coaxially aligned.

7. The electronic assembly according to claim 1, characterized by the following feature:

the at least one bushing comprises over its entire length a diameter which is smaller than the at least one bushing opening of the printed circuit board, so that the at least one bushing is arranged on the printed circuit board without any stops.

8. The electronic assembly according to claim 1, characterized by the following features:

the at least one bushing comprises over a partial length a diameter which is larger than the diameter of the at least one bushing opening, thereby forming a stop surface;

the at least one bushing rests with the stop surface on the second side of the printed circuit board.

9. The electronic assembly according to claim 1, characterized by the following features:

the electronic module comprises a housing cover, whereby the housing cover at least partially encloses the second side of the printed circuit board;

the housing cover comprises at least one insertion opening for insertion of the at least one bushing, wherein:

a) a diameter of the insertion opening is larger than the diameter of the at least one bushing along its longitudinal axis, so that the at least one bushing is supported free of stops relative to the housing cover; or b) a diameter in the region of the second end of the at least one bushing is larger than the insertion opening of the housing cover, thereby forming a stop.

10. The electronic assembly according to claim 1, characterized by the following features:

the printed circuit board comprises at least one signal line opening;

the baseplate module comprises at least one receiving room, wherein the at least one signal conductor is arranged in the at least one receiving room;

the at least one signal conductor protrudes from the at least one receiving room of the baseplate module and projects through the at least one signal line opening of the printed circuit board and is electrically connected to the at least one signal line of the printed circuit board.

11. The electronic assembly according to claim 9, characterized by the following features:

the housing cover comprises at least one opening for inserting a soldering tool for soldering the at least one signal conductor to the at least one signal line of the printed circuit board, wherein the at least one opening in the housing cover is arranged above the at least one signal line opening of the printed circuit board; and/or the housing cover comprises side walls, wherein one of the side walls has at least another opening for inserting soldering material for soldering the at least one signal conductor to the at least one signal line of the printed circuit board.

12. The electronic assembly according to claim 1, characterized by the following feature:

a distance space is formed between an upper side of the baseplate module and the first side of the printed circuit board of the electronic module.

13. The electronic assembly according to claim 1, characterized by the following features:

additional bushings are provided for establishing an electrical contact between the ground plane of the baseplate module and the ground plane of the printed circuit board of the electronic module;

the at least one bushing and the additional bushings are arranged symmetrically to one another and spaced apart symmetrically to the at least one signal conductor.

14. The electronic assembly according to claim 1, wherein:

the at least one bushing opening comprises at least two bushing openings that extend through the printed circuit board;

the at least one electrically conductive bushing comprises at least two electrically conductive bushings with respective first ends and respective opposite second ends, wherein the at least two bushings are inserted through the at least two bushing openings and are galvanically connected to the at least one ground plane of the printed circuit board;

the at least one mounting opening comprises at least two mounting openings;

the at least one screw comprises at least two screws which extend with their respective screw bodies through the at least two bushings and engage into the at least two mounting openings of the baseplate module to form respective screw connections, whereby the at least two bushings are pressed with their respective first ends onto the ground plane of the baseplate module to form respective galvanic connections.

15. A method for producing an electronic assembly for a mobile communication antenna comprising an electronic module and a baseplate module with the following features:

the electronic module comprises a substrate, preferably in form of a printed circuit board, wherein the printed circuit board comprises at least one signal line and at least one ground plane;

the baseplate module comprises at least one ground plane and at least one signal conductor, wherein the at least one signal conductor is electrically connected to the at least one signal line of the printed circuit board;

the printed circuit board comprises a first side and an opposite second side, wherein the first side faces the baseplate module;

at least one bushing opening extends through the printed circuit board;

at least one electrically conductive bushing with a first end and an opposite second end is provided, wherein the at least one bushing is inserted through the at least one bushing opening and is galvanically connected to the at least one ground plane of the printed circuit board;

the baseplate module comprises at least one mounting opening;

at least one screw is provided which extends with its screw body through the at least one bushing and engages into the at least one mounting opening of the baseplate module to form a screw connection, whereby the at least one bushing is pressed with its first end onto the ground plane of the baseplate module to form a galvanic connection;

wherein the method comprises:

testing the electronic module and the baseplate module;

inserting the at least one bushing into the at least one bushing opening of the printed circuit board;

soldering the at least one bushing to the at least one ground plane on the first side of the printed circuit board;

inserting the at least one screw through the at least one bushing and screwing the electronic module to the baseplate module;

soldering the at least one signal conductor to the at least one signal line on the second side of the printed circuit board.

* * * * *